United States Patent [19]

Hannan

[11] 4,350,355
[45] Sep. 21, 1982

[54] WHEEL MEANS FOR CONTAINER HANDLING

[76] Inventor: Garnet M. U. Hannan, Bettina Lodge, Jerilderie St., Jerilderie, N.S.W., 2716, Australia

[21] Appl. No.: 77,168

[22] Filed: Sep. 20, 1979

[30] Foreign Application Priority Data

Oct. 5, 1978 [AU] Australia .............................. PD6246
Apr. 6, 1979 [AU] Australia .............................. PD8344
Jun. 15, 1979 [AU] Australia .............................. PD9277

[51] Int. Cl.³ ............................................ B60B 33/00
[52] U.S. Cl. ........................................ 280/28.5; 16/30; 280/79.1 R
[58] Field of Search ............... 414/337, 338, 373, 389, 414/572; 280/79.1 R, 79.1 A, 79.2, 28.5; 16/29, 30; 105/215 C

[56] References Cited

U.S. PATENT DOCUMENTS

| 1,709,972 | 4/1929 | Dibsdale | 16/30 |
| 3,023,918 | 3/1962 | Penman | 414/337 |
| 3,527,470 | 9/1970 | Ord | 280/79.2 |
| 3,633,774 | 1/1972 | Lee | 280/79.1 R X |
| 3,667,085 | 6/1972 | Cumella et al. | 16/30 |
| 4,090,722 | 5/1978 | Hannan | 414/373 X |
| 4,092,031 | 5/1978 | Greer et al. | 280/79.2 X |

Primary Examiner—Robert G. Sheridan
Attorney, Agent, or Firm—Laney, Dougherty, Hessin & Beavers

[57] ABSTRACT

A wheel mechanism for mounting beneath a container to allow the container to be moved comprises a ground-engaging device such as a wheel or roller assembly swivelably connected to a locking and locating device. The locking and locating device may include a rod and lug or two plates which engage in the bottom of the container to lock the wheel mechanism beneath the container.

13 Claims, 7 Drawing Figures

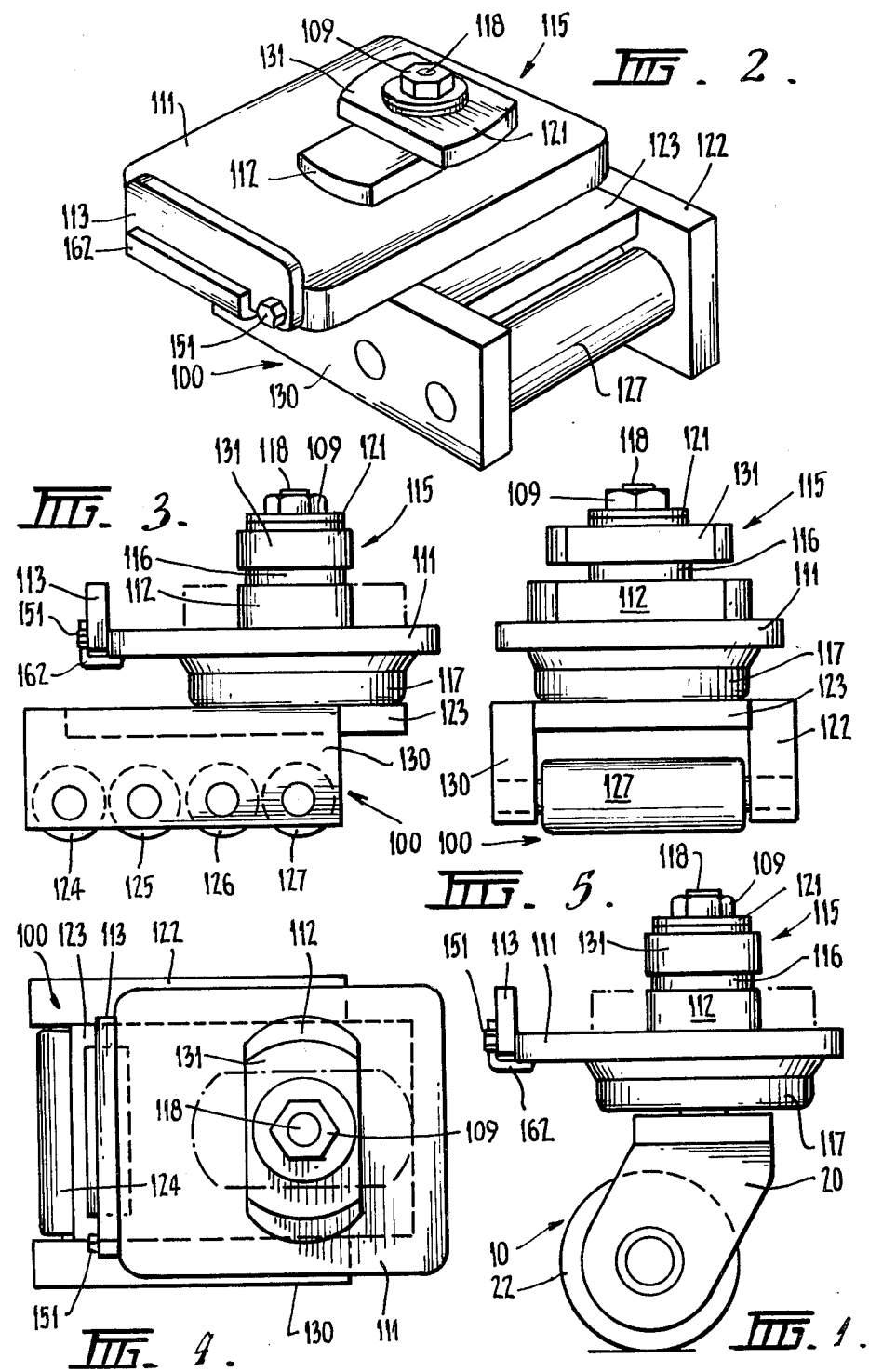

WHEEL MEANS FOR CONTAINER HANDLING

The present invention relates to handling of containers.

Containers are increasingly coming into use for the transport of materials. At the present time there is no practical system available for readily moving containers once they are unloaded from a transporter such as a truck or a railway flat car. This can cause problems in warehouses where it is desired to move a container from one location to another.

The present invention provides wheel means for attachment to the underside of a container to enable the container to be moved. The present invention also provides a system for unloading containers from transporters in such a way that the unloaded containers can be moved.

Containers conventionally comprise a plurality of apertures adjacent each corner. Typically, the containers have a corner block at each corner, each corner block comprising an under aperture, an end aperture and a side aperture. The apertures in the corner blocks are normally used for such purposes as attachment to the transporter during transportation and for attachment of crane hooks when the containers are being lifted.

The present invention provides a wheel means arranged to be mounted with a corner aperture of a container, comprising a base plate having ground engaging means coupled to the underside thereof and a locating and locking device attached to the upper side thereof, said locating and locking device being arranged to engage with the corner aperture of the container. In use, a wheel means of the present invention is attached to each corner of the container and the container can be moved around at will such as by means of a fork-lift truck.

The ground engaging means may be a plurality of rollers. The rollers may have a caterpillar-like track or belt thereabout or may engage the ground themselves.

Alternatively, the ground engaging means may be wheels. Preferably, the ground engaging means is swivellable relative to the locating and locating device.

I have found that when the ground engaging means is in the form of the plurality of rollers, the weight of the containers when supported by the wheel means, is better distributed and causes less fatigue in the wheel means. Hence, this embodiment is more suitable for moving heavy containers.

The locating and locking device comprises a locating and locking plate which are rotatable relative to one another for engagement within the underside aperture of the container.

The present invention will now be described by way of example, with reference to the accompanying drawings, in which:

FIG. 1 is a side view of a first embodiment of the invention;

FIG. 2 is a perspective view of a second embodiment of the invention;

FIG. 3 is a side view of the embodiment of FIG. 2;

FIG. 4 is a top view of the embodiment of FIG. 2;

FIG. 5 is a front view of the embodiment of FIG. 2.

Figure 6:
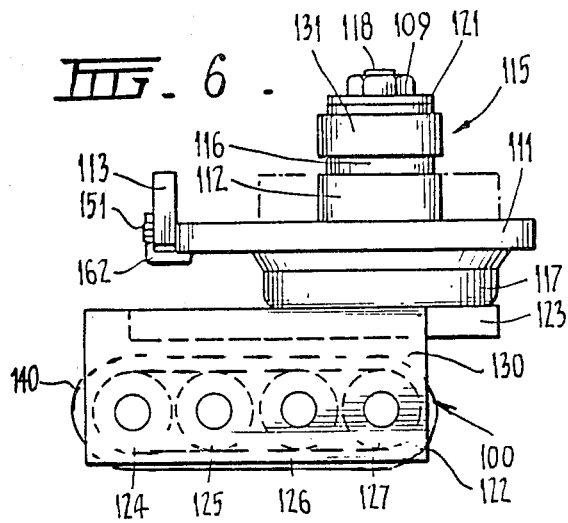
FIG. 6 is a view similar to FIG. 3 showing a third embodiment.

Referring now to FIGS. 1 to 5 which show two embodiments of the invention, FIG. 1 shows an embodiment in which a locking and locating device 115 is identical to that of FIGS. 2 to 5 and which includes a wheel means 10 having a pair of parallel flanges 20 suitably connected in spaced relation by a mounting plate and having a wheel 22 mounted therebetween on an axle.

In FIGS. 1 to 5, a base plate 111 has a taper bearing 117 secured to the underside thereof. The locking and locating device 115 comprises a locating plate 112 which is free to rotate about a sleeve 116 having a shaft 118 therein and a locking plate 131. The shaft 118 terminates in taper bearings 117 so that plate 111 is swingable relative to wheel 22 (FIG. 1) or a roller assembly 100 (FIGS. 2 to 5). The upper end of the shaft 118 is held in the sleeve 116 by a nut 109 and washer 121. The plate 111 has a lever 113 which is rotatable in a vertical plane about pivot 151 out of a holder 162. The lever 113 acts as a handle for rotating the plate 111 and locking and engaging device 115 to lock the same in an aperture of a container. The locking plate 131 which is fixed on sleeve 116 is also fixed relative to the plate 111. Hence, when locking device 115 is located in an aperture and lever 113 is pivoted out of holder 162, the lever 113 may be used to rotate plate 111 so that the locating plate 112 is held captive in the corner aperture by rotating relative to the plate 111 and the locking plate 131 is rotated with the base plate 111 and is thereby held captive in the corner block in the aperture of the container. It should be noted that when the device 115 is positioned in the aperture, the plates 112 and 131 are aligned. Plates 112 and 131 are shown aligned in FIGS. 3–5 which disclose several views wherein the plate 111 is rotated 90° relative to the position of the plate 111 shown in the perspective view of FIG. 2. When the plate 111 is rotated, the locating plate 112 rotates relative to the shaft 116 as the plate is rotated and the plate 131 remains fixed relative to the shaft so that the plates 112 and 131 take up the position shown in FIGS. 2 and 4.

Fixed to bearing 117 is either the wheel means 10 (FIG. 1) or the roller assembly 100 which comprises two flanges 130 and 122 (FIGS. 2 to 5) which are separated by an upper plate 123. The plate 123 is larger in FIGS. 2 to 5 because the length of the rollers are, of course, greater than that of the wheel 22. Rollers 124 to 127 are supported between the flanges 130 and 122.

The rollers distribute the weight of the containers more than a single wheel and result in less fatigue in the wheel means.

Figure 7:
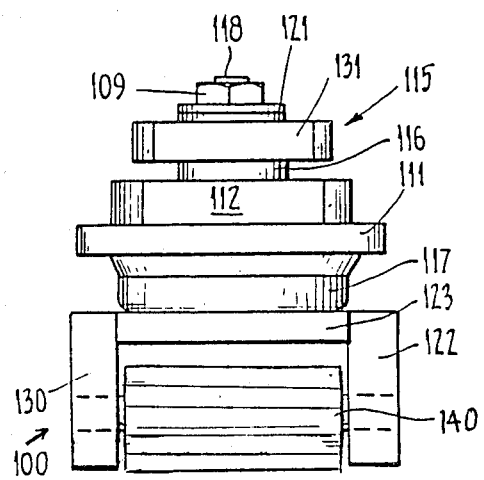
FIG. 7 is a front view of the embodiment of FIG. 6.

In the embodiments of FIGS. 6 and 7 in which same reference numerals indicate the same features with reference to the embodiments of FIGS. 1 to 5, it will be noted that the rollers 124 to 127 have a caterpillar track 140 thereabout. In this embodiment the flanges 130 and 122 are of the same length and the track 140 contacts the ground and allows the apparatus to move along the ground.

The embodiments of the present invention thereof provide a device which will allow containers to be moved in a warehouse as well as unloaded from a truck or the like.

While preferred embodiments of the invention have been described for the purposes of this disclosure, numerous changes in the construction and arrangement of parts can be made by those skilled in the art, which changes are encompassed in the spirit of this invention as defined by the appended claims.

What is claimed is:

1. Apparatus for mounting in a corner aperture of a container, comprising:
   a base plate;
   a ground engaging means coupled to the underside of the base plate; and
   means for locating and locking the base plate with the corner aperture of the container, said means for locating and locking the base plate including:
   a locating plate mounted for rotation relative to the base plate and positioned in the corner aperture; and
   a locking plate mounted in fixed relationship to the base plate so that when the base plate is rotated relative to the corner aperture, the locking plate is also rotated relative thereto to retain its fixed relationship to the base plate and to secure the base plate to the corner aperture, whereas the locating plate is retained positioned in the corner aperture.

2. Apparatus according to claim 1, wherein the ground engaging means includes means for swiveling the ground engaging means relative to the locating and locking means.

3. Apparatus according to claim 1, wherein the locating and locking means further includes a shaft extending through the locating plate and the locking plate and through the base plate for mounting the locating plate and locking plate on the base plate.

4. Apparatus according to claim 3, further comprising a taper bearing, disposed between the base plate and the ground engaging means, for receiving one end of the shaft.

5. Apparatus according to claim 1 wherein the ground engaging means includes a wheel.

6. Apparatus according to claim 5 wherein the ground engaging means further includes:
   a mounting plate connected to the baseplate;
   a pair of flanges connected to the mounting plate in spaced relation to each other for receiving the wheel therebetween; and
   an axle for connecting the wheel to the flanges.

7. Apparatus according to claim 1, wherein the ground engaging means includes a roller assembly.

8. Apparatus according to claim 7, wherein the roller assembly includes:
   an upper plate coupled to the base plate;
   a pair of flanges connected to the upper plate; and
   a plurality of rollers mounted between the flanges.

9. Apparatus according to claim 8, wherein the roller assembly further includes a caterpillar track disposed around the rollers.

10. Apparatus according to claim 8, wherein each of the plurality of rollers mounted between the flanges projects below at least one of the flanges for engaging a surface upon which the apparatus is placed.

11. Apparatus for mounting in a corner aperture of a container, comprising:
    a base plate;
    means for locating and locking the base plate with the corner aperture of the container, said means for locating and locking the base plate including:
    a locating plate mounted for rotation relative to the base plate and positioned in the corner aperture; and
    a locking plate mounted in fixed relationship to the base plate so that when the base plate is rotated relative to the corner aperture, the locking plate is also rotated relative thereto to retain its fixed relationship to the base plate and to secure the base plate to the corner aperture, whereas the locating plate is retained positioned in the corner aperture; and
    a roller assembly coupled to the underside of the base plate, said roller assembly including:
    a pair of sidewall members; and
    a plurality of rollers mounted between the sidewall members such that the weight of the container supported on the apparatus is taken by said plurality of rollers.

12. Apparatus according to claim 11, wherein the rollers project below the sidewalls and engage the ground.

13. Apparatus according to claim 11, wherein the rollers have a caterpillar track thereabout, the caterpillar track projecting below the sidewalls to engage the ground and transfer the weight of the container to said rollers.

* * * * *